(12) United States Patent
Foursa et al.

(10) Patent No.: US 12,184,403 B2
(45) Date of Patent: Dec. 31, 2024

(54) SEMICONDUCTOR BASED SYSTEM AND METHOD FOR BROAD BANDWIDTH TRANSMISSION

(71) Applicant: SUBCOM, LLC, Eatontown, NJ (US)

(72) Inventors: Dmitri G. Foursa, Colts Neck, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 18/480,271

(22) Filed: Oct. 3, 2023

(65) Prior Publication Data

US 2024/0031051 A1    Jan. 25, 2024

Related U.S. Application Data

(63) Continuation of application No. 17/853,380, filed on Jun. 29, 2022, now Pat. No. 11,863,296.

(60) Provisional application No. 63/234,941, filed on Aug. 19, 2021.

(51) Int. Cl.
| | |
|---|---|
| *H04B 10/00* | (2013.01) |
| *H04B 10/291* | (2013.01) |
| *H04J 14/02* | (2006.01) |
| *H04J 14/06* | (2006.01) |
| *H04J 14/00* | (2006.01) |

(52) U.S. Cl.
CPC .......... *H04J 14/06* (2013.01); *H04B 10/2914* (2013.01); *H04J 14/0221* (2013.01)

(58) Field of Classification Search
CPC .............. H04B 10/2914; H04B 10/294; H04B 10/2941

See application file for complete search history.

(56) References Cited

U.S. PATENT DOCUMENTS

| | | | | |
|---|---|---|---|---|
| 2007/0183023 A1* | 8/2007 | Iannone | ............. | H04J 14/0221 359/337.12 |
| 2009/0034974 A1* | 2/2009 | Grubb | ................. | H04J 14/0205 398/68 |
| 2013/0341668 A1* | 12/2013 | Tanaka | .................... | H01L 33/58 257/98 |

* cited by examiner

*Primary Examiner* — Daniel G Dobson
(74) *Attorney, Agent, or Firm* — KDW Firm PLLC

(57) ABSTRACT

Disclosed are techniques and amplifier stages that include wave division multiplexers, semiconductor optical amplifiers and wave division demultiplexers that amplify optical signals. An input optical signal having a first bandwidth is partitioned into a plurality of subband optical signals by thin film filters tuned to a selected bandwidth that is less than the first bandwidth. Each of the plurality of subband optical signals has a bandwidth that is a portion of the first bandwidth. Each subband optical signal is input into a semiconductor optical amplifier that is tuned to the respective portion of the first bandwidth that corresponds to the subband optical signal. The combination of the partitioned input optical signal and tuned semiconductor optical amplifiers provides improved optical signal transmission performance by reducing polarization dependent gain.

18 Claims, 5 Drawing Sheets

SEMICONDUCTOR BASED SYSTEM AND METHOD FOR BROAD BANDWIDTH TRANSMISSION

RELATED APPLICATIONS

This application is a continuation of U.S. patent application Ser. No. 17/853,380, filed Jun. 29, 2022, which claims priority to U.S. Provisional Patent Application Ser. No. 63/234,941, filed Aug. 19, 2021, entitled SEMICONDUCTOR BASED SYSTEM AND METHOD FOR BROAD BANDWIDTH TRANSMISSION, and incorporated herein by reference in their entirety.

BACKGROUND

In wavelength division multiplexing (WDM) optical communication systems, a single optical fiber may be used to carry multiple optical signals. The multiple optical signals are multiplexed to form a multiplexed signal or WDM signal with each of the multiple signals being modulated on separate channels. Each channel may be at an associated wavelength that is separated from adjacent channels by a defined channel-spacing, e.g., spacing defined according to a channel plan in a system design, the plan established by the International Telecommunications Union (ITU) or the like. The range of wavelengths that may be transmitted on the system is known as the system bandwidth. Systems may utilize their system bandwidth to carry a desired number of channels with desired modulation format and bit rate.

One example of a prior art WDM transmission system 100 is illustrated in FIG. 1. The illustrated WDM system 100 includes first 102 and second 104 transceivers, an optical cable 106, and optical repeaters 108-1 ... 108-$n$. The optical cable 106 includes at least one pair of optical fibers 110$e$, 110$w$ and a power conductor 112 for carrying electrical power to components coupled to the optical cable 106.

The system 100 serves to transmit optical signals TX1, TX2, TX3 from the first transceiver 102 in an "east" direction over fiber 110$e$ to the second transceiver 104, where they are reproduced as received signals RX1, RX2, RX3, respectively. The system 100 also serves to transmit optical signals TX4, TX5, TX6 from the second transceiver 104 in a "west" direction over the fiber 110$w$ to the first transceiver 102, where they are reproduced as received signals RX4, RX5, RX6, respectively.

Each of the repeaters 108-1 ... 108-$n$ includes an erbium doped fiber amplifier (EDFA) 114-1 ... 114-$n$, respectively, coupled to the "east" direction fiber 110$e$ and an EDFA 116-1 ... 116-$n$, respectively, coupled to the "west" direction fiber 110$w$ for amplifying WDM signals on the fibers 110$e$ and 110$w$. As is known, a rare-earth doped optical amplifier, such as an EDFA, operates by passing an optical signal through a doped fiber segment, and "pumping" the segment with light from another source such as a laser. The pump source excites rare-earth atoms, e.g. erbium atoms in the case of an EDFA, in the doped segment, which then serve to amplify the optical signal passing through the EDFA.

Within each repeater 108-1 ... 108-$n$ the EDFAs 114-1 ... 114-$n$ and 116-1 ... 116-$n$, respectively, are pumped by a common optical pump unit (OPU) 118-1 ... 118-$n$ to cause amplification of the WDM signals passing through the EDFAs 114-1 ... 114-$n$ and 116-1 ... 116-$n$ on the optical fibers 110$e$, 110$w$. Each of the OPUs 118-1 ... 118-$n$ includes a plurality of pumps. In general, the outputs of the pumps are combined and then split to provide two or more pump outputs for each OPU 118-1 ... 118-$n$. The output power at each output of the OPUs 118-1 ... 118-$n$ is thus a combination of the pump power provided by each of the plurality of pumps in the OPU 118-1 ... 118-$n$. Advantageously, if one of the pumps in the OPU 118-1 ... 118-$n$ fails, pump power from the other pump(s) with in the OPU 118-1 ... 118-$n$ is still provided at the outputs of the OPU 118-1 ... 118-$n$ for pumping the EDFAs 114-1 ... 114-$n$ and 116-1 ... 116-$n$, respectively. Use of a common OPU 118-1 ... 118-$n$ for the EDFAs 114-1 ... 114-$n$ and 116-1 ... 116-$n$, respectively, in each repeater 108-1 ... 108-$n$ thus provides redundancy of pump power for pumping the EDFAs 114-1 ... 114-$n$ and 116-1 ... 116-$n$ within each repeater 108-1 ... 108$n$.

Electrical power for driving the pumps within the OPUs 118-1 ... 118-$n$ is coupled to the OPU through the power conductor 112 in the optical cable 106. Power feed equipment (PFE) 120 in the transceiver 102 supplies the electrical power to the power conductor 112. The system 100 may be described as a power-limited system since the maximum power that the PFE equipment 120 may deliver to the power conductor 112 is limited by length (determined by distance between the transceivers) and configuration (e.g., composition, diameter etc.) of the power conductor 112. Since the system 100 is a power-limited system, the electrical power available for driving the pumps in the OPUs 118-1 ... 118-$n$ is limited, which limits the amount of total pump power that may be provided by the OPUs 118-1 ... 118-$n$.

BRIEF SUMMARY

In one aspect, an optical amplifier stage is provided that includes an optical signal divider, a plurality of semiconductor optical amplifiers, and an optical signal combiner. The optical signal divider has an input and a plurality of outputs. The optical signal divider is operable to receive an optical signal having a first bandwidth and divide the optical signal into subbands for distribution among the plurality of optical signal divider outputs. Each of the plurality of semiconductor optical amplifiers has an input coupled to a respective optical signal divider output of the plurality of optical signal divider outputs. Each semiconductor optical amplifier is tuned to amplify a respective subband within the first bandwidth of the optical signal and has an output to output an amplified optical signal encompassing the respective subband. The optical signal combiner coupled to the output of each of the plurality of semiconductor optical amplifiers is operable to combine each respective amplified optical signal encompassing the respective subband, and output an amplified optical signal having the first bandwidth.

In one aspect, an optical signal amplifier stage, includes an input wavelength division demultiplexing section, an amplifier section and an output wavelength division multiplexing section. The input wavelength division demultiplexing section has an input operable to receive an optical signal having a plurality of bands. The input wavelength division demultiplexing section includes a first wavelength division demultiplexer and a plurality of second wavelength division demultiplexers. The first wavelength division demultiplexer is tuned to a first bandwidth of optical spectrum that includes the plurality of bands of the received optical signal, and each respective second wavelength division demultiplexer of the plurality of second wavelength division demultiplexers is tuned to one or more of the plurality of bands of the optical spectrum. The amplifier section includes a plurality of semiconductor optical amplifiers. Each respective semiconductor optical amplifier of the plurality of semiconductor optical amplifiers includes an input coupled to a respective second wavelength division demultiplexer of the input wavelength division demultiplexing section. Each semiconductor optical amplifier is configured to amplify a respective portion of the first bandwidth output from a respective second wavelength division demultiplexer of the plurality of second wavelength division demultiplexers. The output wavelength division multiplexing section is coupled to an output of each of the plurality of semiconductor optical amplifiers in the amplifier section and includes a plurality of primary output wavelength division multiplexers and a secondary output wavelength division multiplexer coupled to a respective output of each of the plurality of first output wavelength division multiplexers. The output wavelength division multiplexing section is operable to output an amplified optical signal of the first bandwidth.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Semiconductor optical amplifier (SOA) is among few means to amplify optical signal in telecommunication systems. Miniature size of the waveguide structure that potentially allows high level of integration with flexibility in designing amplification in the desired bandwidth makes it attractive for optical communication systems.

Long haul optical transmission using SOAs to compensate for the loss of the fiber spans revealed a potential to transmit WDM signals over distances that approach a transoceanic scale. One of the drawbacks of SOAs that limit the transmission distance is polarization dependent gain (PDG). SOAs can be designed with polarization independent gain, which is also referred to as "polarization diversity gain. It turns out, that low PDG of a typical SOA with polarization diversity is achieved over the bandwidth, that is smaller, compared to the potentially wide gain bandwidth, supported by the semiconductor structures. Broad amplification transmission bandwidth can be achieved by using single polarization SOAs and polarization multiplexing. While the configuration includes more complexity due to the use of polarization splitters and combiners that limit the polarization extinction ratio of the optical signals, but the level of potential integration is reduced. The disclosed examples describe an alternative approach to increasing bandwidth using SOA with polarization independent gain.

The disclosed amplifier stages described herein may include wave division multiplexers, semiconductor optical amplifiers and wave division demultiplexers that amplify optical signals. An input optical signal having a first bandwidth is partitioned into a plurality of subband optical signals by thin film filters tuned to a selected bandwidth that is less than the first bandwidth. Each of the plurality of subband optical signals has a bandwidth that is a portion of the first bandwidth. Each subband optical signal is input into a semiconductor optical amplifier that is tuned to the respective portion of the first bandwidth that corresponds to the subband optical signal. The combination of the partitioned input optical signal and tuned semiconductor optical amplifiers provides improved optical signal transmission performance by reducing polarization dependent gain.

Figure 1:
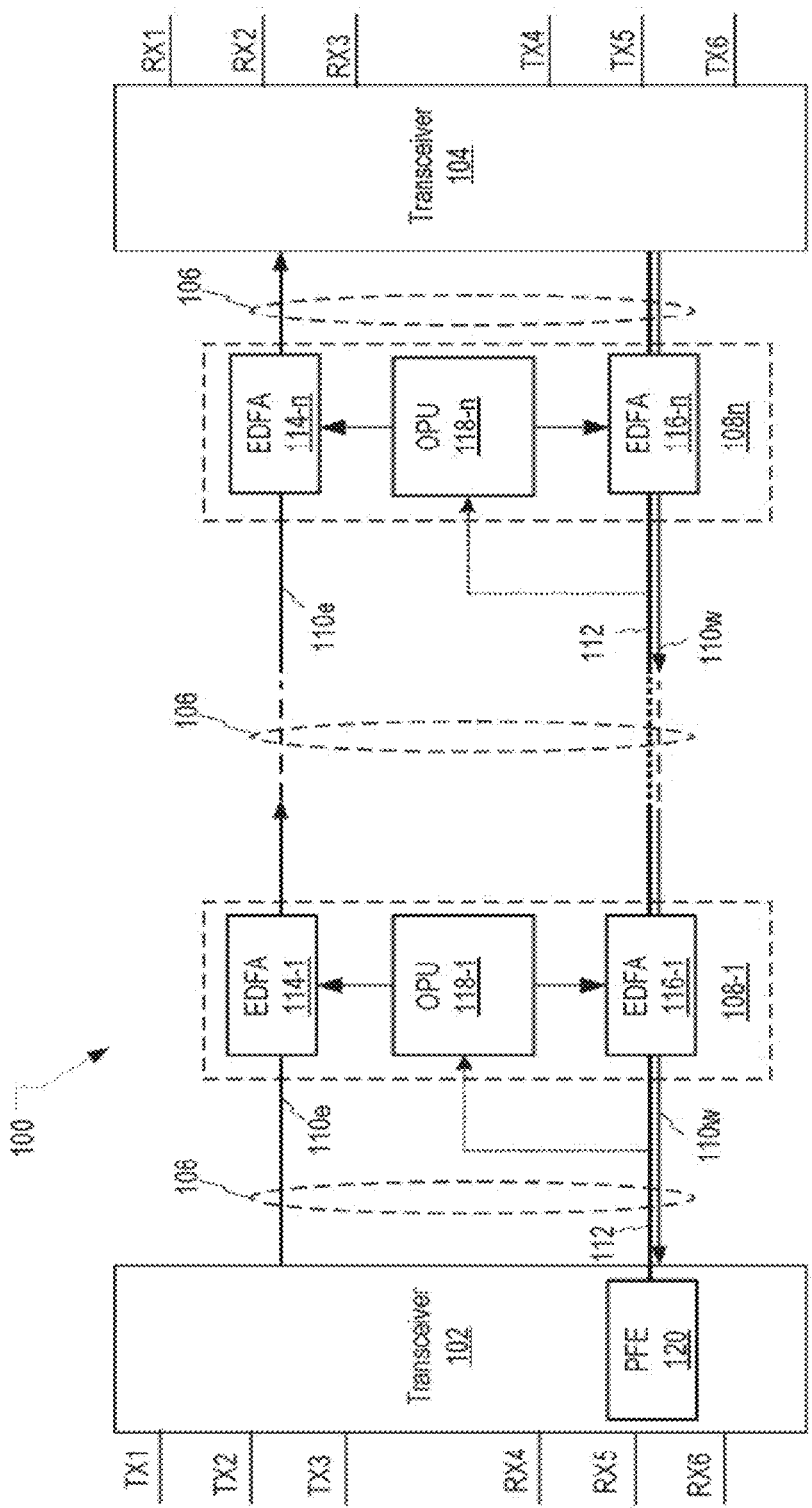
FIG. 1 illustrates a prior art wavelength division multiplexer transmission system.
Figure 2A:
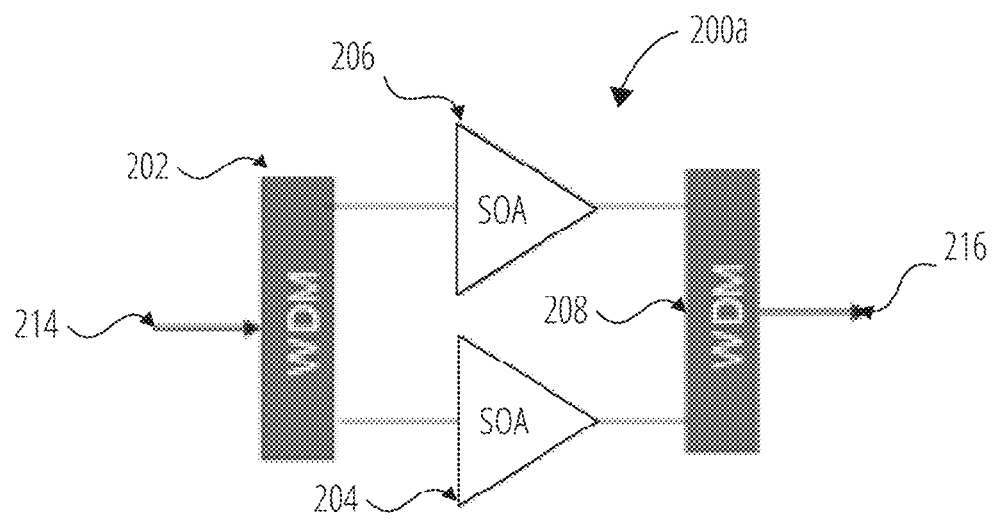
FIG. 2A illustrates an example of an amplifier stage that enables two bandwidths to be amplified separately.

In contrast to the amplification system of FIG. 1, FIG. 2A illustrates an example of an aspect of the subject matter in which bandwidth is extended and polarization dependent gain is minimized enabling two bandwidths to be amplified. SOAs are utilized in this instance as it is configured to only amplify the inputted optical signal. The output of two or more SOAs may be combined using a wavelength division multiplexer (WDM).

In the amplifier stage 200a, the two types of SOAs 204 and 206 are combined with wave division demultiplexer 202 and wave division multiplexer 208. For example, in the amplifier stage 200a, the input signal 214 may be a multi-channel optical signal that extends over a set bandwidth. The wave division demultiplexer 202 may be operable to demultiplex the multi-channel optical signal into respective channels that are input respectively into SOAs 204 and 206 for amplification.

The parameters of the respective SOAs 204 and 206 that may be tuned to include a maximum PDG (i.e., $PDG_{max}$) and a maximum transmission performance penalty resulting from $PDG_{max}$ that is allowed by the transmission system design, a maximum operating bandwidth where $PDG_{max}$ can be satisfied, and/or a minimum gain in the operating bandwidth, where $PDG_{max}$ can be achieved or the like. By optimizing one or more of the parameters of the SOA, amplification in the transverse electric (TE) mode may be increased while the signal gain in the transverse magnetic (TM) mode may be reduced. An accurate match between gains in the TE and TM modes in an SOA may result in zero polarization dependent gain (PDG), or at least substantially zero PDG, and essentially complete polarization diversity. Although it is possible to achieve the difference between the TE and TM mode gains of less than 0.1 dB and resulting PDG <0.1 dB, maintaining the difference between the TE and TM modes at that level and the PDG at less than 0.1 dB over an extended bandwidth, such as the entire range of the C-band, may be challenging. Note that the C-band is widely used in optical communications. An SOA, such as 204, may be selected having an amplification bandwidth with polarization diversity gain and sufficiently low PDG for a chosen transmission distance. In addition, according to various non-limiting embodiments, an SOA may be designed to provide amplification and also minimize PDG within a limited optical bandwidth, such as 15, 20, 30, 40, 80 nanometers (nm), or other suitable bandwidth. The anticipated maximum PDG within the bandwidth, for example, may be between 0.3-0.5 dB between two polarizations.

In addition, by designing the gain allocation of the SOA, the low PDG bandwidth can be achieved over different sections of the transmission spectrum. The SOA design differences between the number of SOAs enables a first SOA to amplify signals within a first bandwidth, such as a 15 nm bandwidth, with low PDG and a second SOA within a second bandwidth also 15 nm bandwidth but shifted in the electromagnetic spectrum from the first bandwidth, and also providing low PDG.

For example, one type of SOA design can provide amplification over C-band. The gain characteristics of another SOA can be shifted to an L-band and designed to provide similar amplification and similarly low PDG over L-band. The WDMs 202 and 208 may be based on fiber fused devices or thin film (TF)-based couplers in which the TF-based couplers allow integration using micro assemblies. Due to the nature of the SOAs 204 and 206, the transmission bandwidth can be extended beyond the conventional C+L range used in commercial telecommunication systems.

The amplified output from each respective SOA 204 and 206 may be combined by wave division multiplexer 208 as an output signal 216 that combines the respective bands of each channel and is an amplified version of the input signal 214 for output from the amplifier stage 200a.

To obtain a greater transmission bandwidth (e.g., 80 nm), the transmission signal may be divided into different bandwidths (e.g., 20 nm or 40 nm) and a portion of the divided signal bandwidth may be directed to an SOA specifically designed to amplify that portion of the signal bandwidth and another portion of the divided signal bandwidth may be directed to another SOA specifically designed to amplify the other portion. For example, the transmission bandwidth may be set (e.g., 80 nm in the spectrum of 1530 nm to 1610 nm, where 1530-1565 nm corresponds to the C band, and 1565-1610, which corresponds to the L band that are used in telecommunications) and be subdivided utilizing WDMs, such as 202.

Figure 2B:
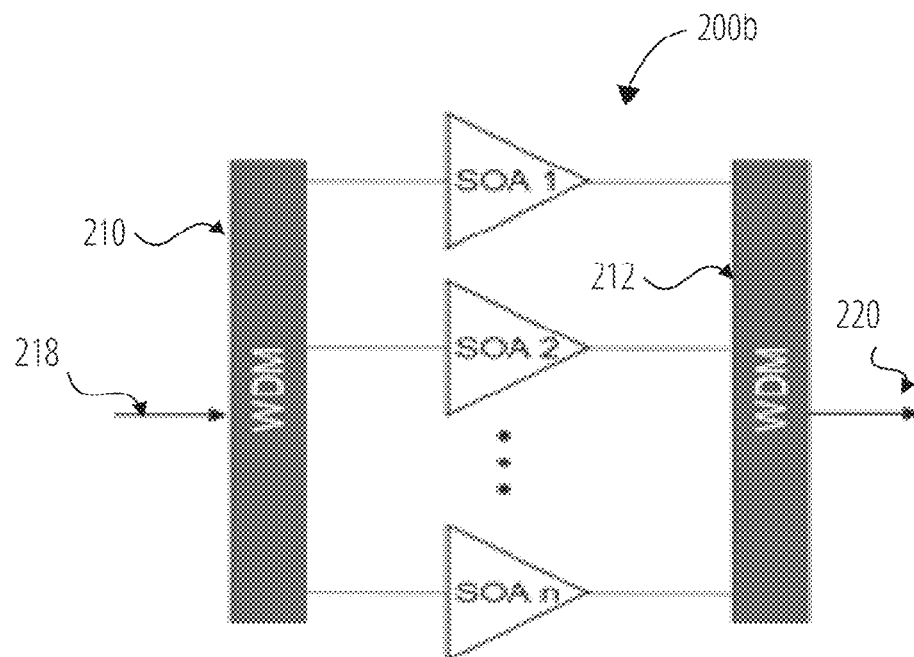
FIG. 2B illustrates an example of an amplifier stage that enables multiple bandwidths combined.

FIG. 2B illustrates an example of an aspect of the subject matter in which bandwidth is extended and polarization dependent gain is minimized enabling multiple bandwidths combined.

Similarly, three or more types of SOAs, such as SOA 1, SOA 2 . . . SOA n, may be designed to amplify WDM signals over three or more parts of the signal spectrum that may be combined to form a continuous transmission bandwidth that is either focused on minimizing polarization dependent gain and/or extending the transmission bandwidth.

For example, in the amplifier stage 200b, the several types of SOAs, such as SOAs 1 and 2-n, are combined with wave division demultiplexer 210 and wave division multiplexer 212. The input signal 218 to amplifier stage 200b may be a multi-channel optical signal that extends over a set bandwidth, e.g., 1530-1565 nm (which corresponds to the C band), 1565-1625 (which corresponds to the L band), 1460-1530 (which corresponds to the S band), 1360-1460 nm (which corresponds to the E band), combinations of the respective C, L, S and E bands, or the like. For example, a multi-channel optical signal may be in the range of 1530-1625 nm and encompass all or portions of the C and L bands. The wave division demultiplexer 210 may be operable to demultiplex the multi-channel optical signal into respective channels that are input respectively into SOA 1 and SOA 2-SOA n for amplification. The amplified signal output from each of the respective SOAs 1 and 2-n may be combined by wavelength division multiplexer 212. Due to the nature of the SOAs 1 through n being configurable to amplify optical signals having different wavelengths with different polarizations, the respective optical signals may be amplified differently by each respective SOA 1 through n, which enables the transmission bandwidth of the optical signals to be extended beyond the conventional C+L band range used in commercial telecommunication systems.

Figure 3:
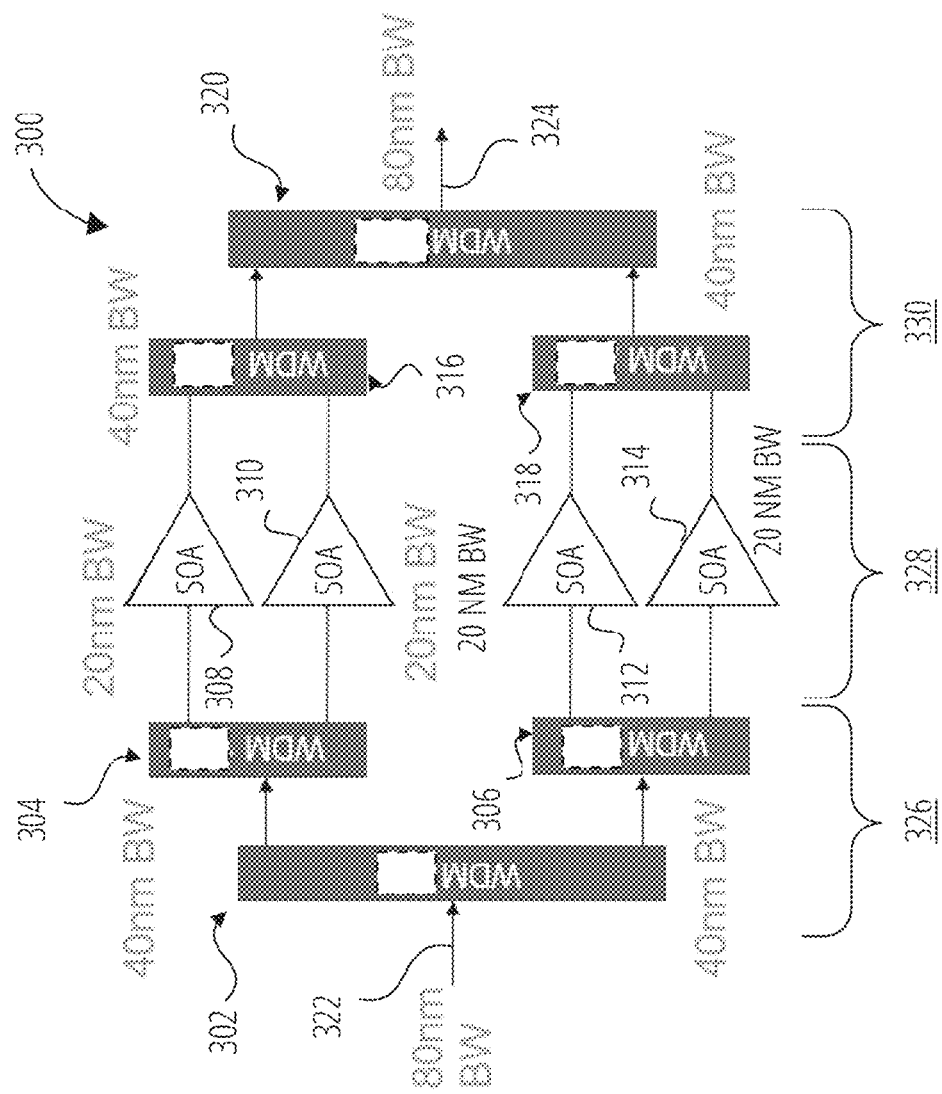
FIG. 3 illustrates an example of a multichannel amplifier stage that utilizes multiple three-port wavelength division multiplexer dividers and combiners in combination with semiconductor optical amplifiers.

FIG. 3 illustrates an example of a multichannel amplifier stage that utilizes multiple three-port WDM combiners and dividers in combination with semiconductor optical amplifiers.

The optical signal amplifier stage 300 may include an input wavelength division demultiplexing section 326, an amplifier section 328 and an output wavelength division multiplexing section 330.

The input wavelength division demultiplexing section 326 may include a first wavelength division multiplexer 302 and a number of second wavelength division demultiplexers, such as 304 and 306. The first wavelength division demultiplexer 302 may be tuned to a first bandwidth.

In this example, the optical signal 322 may be 80 nm, which may be the first bandwidth. The 80 nm bandwidth may include a number of separate bands. Each respective second wavelength division demultiplexer, 304 and 306 of the number of second wavelength division demultiplexers may tuned to one or more of the plurality bands of the optical spectrum encompassed in the 80 nm bandwidth. The amplifier section 328 may include a number of amplifiers, such as semiconductor optical amplifiers 308, 310, 312 and 314. Each respective semiconductor optical amplifier 308, 310, 312 and 314 of the number of semiconductor optical amplifiers may include an input coupled to a respective second wavelength division demultiplexer of the input wavelength division demultiplexing section. And each respective semiconductor optical amplifier 308, 310, 312 and 314 may be configured to amplify the respective portion of the first bandwidth output from the respective second wavelength division demultiplexer.

For example, the first wavelength division multiplexer 302 second wavelength division demultiplexer 304 may divide the first bandwidth that in FIG. 3 is 80 nm into 2 signals having bandwidths of 40 nm and output a first of the 40 nm bandwidth signals to second wavelength division demultiplexer 304 and output a second of the 40 nm bandwidth signals to second wavelength division demultiplexer 306. The second wavelength division demultiplexer 304 and the second wavelength division demultiplexer 306 may each further divide the 40 nm input signal into two 20 nm bandwidth signals.

The two 20 nm bandwidth signals may be output from the second wavelength division demultiplexer 304 and input into the amplifier stage 328. A first of the two 20 nm bandwidth signals may be input to the SOA 308 and a second of the two 20 nm bandwidth signals may be input to the SOA 310. Similarly, the two 20 nm bandwidth signals output from the second wavelength division demultiplexer 306 may be input into the amplifier stage 328. A first of the two 20 nm band width signals output from second wavelength division demultiplexer 306 may be input to the SOA 312 and a second of the two 20 nm bandwidth signals may be input to the SOA 314.

Each respective SOA 308, 310, 312 and 314 may amplify respective portions of the first bandwidth with specified gain that also has low polarization dependent gain and output an amplified optical signal. In this example, the amplified optical signal output from each of the respective SOAs 308, 310, 312 and 314 is the 20 nm bandwidth signals. Each respective SOA of SOAs 308, 310, 312 and 314 may be tuned (e.g., during fabrication) to a range of wavelengths that provide a specified gain in that range of wavelengths while maintaining a low polarization dependent gain. Tuning of the SOAs 308-314 may, for example, be based on a transmission system cost function that takes into account the use of SOAs in the transmission system. Of course, other tuning methods may be used.

Outputs from the amplifier section 328 may be applied to the output wavelength division multiplexing section 330. The output wavelength division multiplexing section 330 may include a number of secondary output wavelength division multiplexers and a primary output wavelength division multiplexer. Each of the respective secondary output wavelength division multiplexers, such as secondary output wavelength division multiplexer 316 and secondary output wavelength division multiplexer 318, may individually be referred to as a secondary output WDM or a secondary WDM combiner. The primary output wavelength division multiplexer, such as 320, may also be referred to as a primary output WDM or a primary WDM combiner.

In the FIG. 3 example, the respective outputs of SOA 308 and SOA 310 are coupled to a secondary WDM combiner 316 of the number of secondary output wavelength division multiplexers, which in this case, is a pair of secondary WDM combiners. The respective outputs of SOA 308 and SOA 310 may be coupled to a secondary WDM combiner 318 of the pair of WDM combiners. The 20 nm bandwidth signals output from each respective SOA 308 and SOA 310 may be combined by the first WDM combiner 316 to form a 40 nm bandwidth signal. Similarly, the 20 nm bandwidth signals output from each respective SOA 312 and SOA 314 may be combined by the first WDM combiner 318 to form an amplified 40 nm bandwidth signal.

Each of the respective first WDM combiners 316 and 318 output the 40 nm bandwidth signal to the primary output wavelength division multiplexer 320 (also referred to as the primary WDM combiner 320). The primary WDM combiner 320 is operable to combine the amplified 40 nm bandwidth signals received from the respective first WDM combiners 316 and 318 and to output an amplified optical signal 324. The SOAs 308 and 310 may be designed to provide equal, or substantially equal, amplification to each signal. The amplified optical signal 324 has a bandwidth equal to the first bandwidth, which is 80 nm.

It is noted that FIG. 3 shows a specific implementation of demultiplexing and multiplexing an optical signal having a given bandwidth (in this case 80 nm), where the bandwidths of the different demultiplexed signals and multiplexed signals are equal to one another at each stage (80 nm, 40 nm, 20 nm, 40 nm, 80 nm), in various embodiments, the different signals need not have the same bandwidth at each stage. Thus, an 80 nm bandwidth signal may be demultiplexed by first wavelength division multiplexer 302 into a 50 nm bandwidth signal and a 30 nm signal. Likewise, the of second wavelength division demultiplexers, such as 304 and 306 may demultiplex the respective 50 nm bandwidth signal and 30 nm bandwidth signal, respectively, according to any suitable scheme. For example, the second wavelength division demultiplexer 304 may partition the 50 nm bandwidth signal into a 30 nm bandwidth signal and a 20 nm bandwidth signal, while the second wavelength division demultiplexer 306 may partition the 30 nm bandwidth signal into a 18 nm bandwidth signal and a 12 nm bandwidth signal. These non-equal-bandwidth signals may then be multiplexed to generate the outgoing optical signal having, for example, an 80 nm bandwidth, generally as described above with respect to WDM combiners 316, 318, and 320. The embodiments are not limited in this context.

Figure 4:
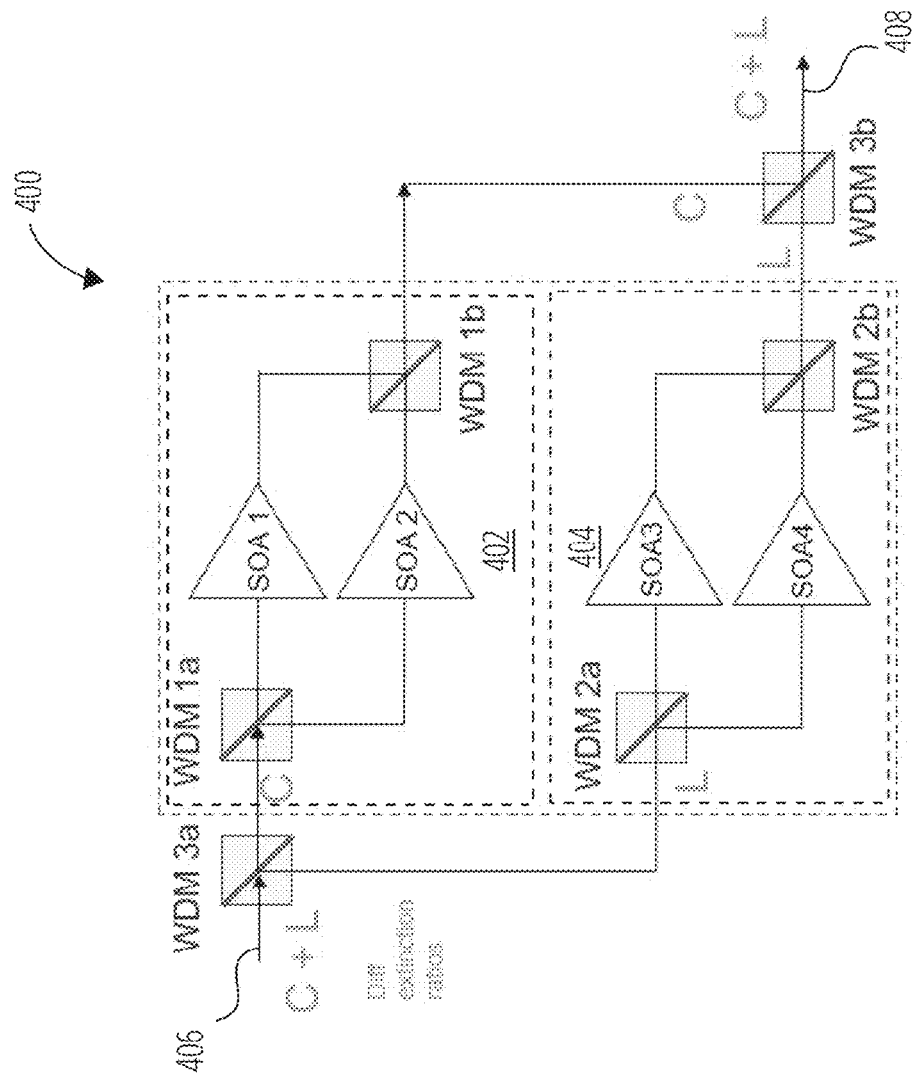
FIG. 4 illustrates an aspect of the subject matter in accordance with an embodiment.

FIG. 4 illustrates an aspect of the subject matter in accordance with an embodiment. The example illustrated in FIG. 4 is explained based on the use of the C and L bands of the electromagnetic spectrum for ease of discussion. However, in other embodiments, other bands, such as the S band, O band, or portions overlapping bands of the electromagnetic spectrum may be used and SOAs that accommodate the other bands or portions may be fabricated and used.

The C+L amplifier stage 400 includes at least a C-band amplification section 402 and a L-band amplification section 404. The respective inputs to the C+L amplifier stage 400 are provided by a WDM divider WDM 3a that may include thin film filters (TFF) tuned to a selected bandwidth, such as the C+L band or another bandwidth. For example, WDM 3a may transmit wavelengths in part of the C band (as well as some wavelengths that overlap in the L band) and may reflect wavelengths in part of the L band (as well as some wavelengths that overlap in the C band). The WDM 3a may be an input wavelength division demultiplexing section having an input operable to receive an optical signal having a plurality of bands.

In the amplifier stage 400, the WDM 3a outputs optical signals substantially in the C band to amplification section 402 and outputs optical signals substantially in the L band to amplification section 404. Respective WDM dividers WDM 1a of amplification section 402 and WDM 2a of amplification section 404 may further divide the inputted signal for amplification. In amplification section 402, for example, WDM 1a may subdivide the inputted, substantially C band signal into a pair of narrower bandwidth signals for amplification of each respective narrower bandwidth signals by respective SOA 1 and SOA 2. The amplified signals output from respective SOA 1 and SOA 2 may be combined by a WDM combiner WDM 1b to provide an amplified signal having a bandwidth substantially equal to, or greater bandwidth than, the bandwidth of the signal input to WDM 1a.

While in amplification section 404, for example, WDM 2a may subdivide the inputted, substantially L band signal into a pair of narrower bandwidth signals for amplification of each respective narrower bandwidth signals by respective SOA 3 and SOA 4. Similar to amplification section 402, the amplified signals output from respective SOA 3 and SOA 4 may be combined by a WDM combiner 2b to provide an amplified signal having substantially equal or greater bandwidth than the signal input to WDM 2a.

The WDM 3b may be an output wavelength division multiplexing section that is operable to output an amplified optical signal of a first bandwidth. The amplified signals output from the respective amplification sections 402 and 404 are combined by another WDM combiner WDM 3b to provide an amplified signal having a bandwidth substantially equal to, or greater bandwidth than, the bandwidth of the signal input to WDM 3a.

The example of FIG. 4 provides an amplifier stage that enables increased bandwidth (due to allowing less separation between bands) and PDG minimization by using WDM dividers and WDM couplers based on TFFs. For example, a TFF may be designed based on a bandwidth selected for amplification. Alternatively, or in addition, one or more TFFs may be designed for used in the amplification based on the band or channel transitions within the bandwidth selected for amplification. The WDM division and combining (or multiplexing) uses alternative TFF properties: if WDM division uses transmissive properties of TFF, then WDM combining may be done using reflective properties of TFF. Alternatively, if WDM division uses reflective properties of TFF, then WDM combining may be done using transmissive properties of TFF.

The alternating of transmissions and reflections by the combiner enables a maximum and equal extinction ratio between bands, such as the C band and the L band in this example. The alternation of the transmissions and reflections by the combiner is used because reflective and transmissive characteristics of TFF does not provide the same extinction of the adjacent band. For example, the C+L band signal at the input of C- and L-band WDM will experience minimum insertion loss for the C-band and high rejection of the L-band for signal passing to the output port. Typical rejection may exceed 40 dB for the entire L-band, which is sufficiently high for penalty-free operation. At the same time signal reflected to the other output port will have minimum insertion loss for the L-band but lower rejection for the C-band. Typical rejection of the C-band may be less than 20 dB. If the same type of WDM is used to combine the amplified C- and L-band signals back into one path, repetitive use of that arrangement will result in consistently lower rejection of L-band signals in the C-band amplification section. Due to broadband amplification nature of SOA, interference penalty will occur because of the amplification of signals from adjacent bands and subsequent combination of all signals. The arrangement of amplifier stage 400 minimizes cross talk between bands and the interference penalty after transmission.

While the example of FIG. 4 utilizes the reflective and transmissive properties of TFFs, other WDM combiner/dividers that are based on different principles that do not involve consideration of reflective and transmissive properties of TFFs may be used.

Figure 5:
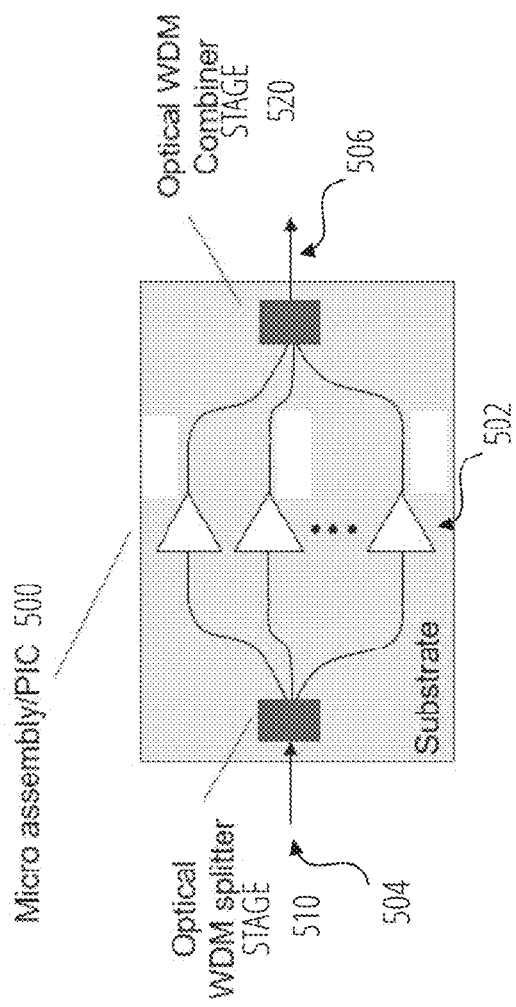
FIG. 5 illustrates an example of a semiconductor package suitable for implementing one or more of the examples of FIGS. 2-4.

FIG. 5 illustrates an example of a semiconductor package suitable for implementing one or more of the examples of FIGS. 2-4. The semiconductor package 500 may be a microassembly, a photonic integrated circuit (PIC) or integrated optical circuit. The PIC may be a device that integrates multiple (at least two) photonic functions and as such is similar to an electronic integrated circuit. An optical input signal 504 that has a selected optical bandwidth, such as 40, 60 or 80 nm, may be input to the semiconductor package 500. The semiconductor package 500 may include an optical WDM splitter/divider stage 510, a number of semiconductor optical amplifiers 502 and optical WDM combiner stage 520. The optical WDM splitter/divider stage 510 receives the optical input signal 504 and as described above with reference to the earlier examples is operable to split or divide the optical input signal 504 for distribution to two or more of the semiconductor optical amplifiers 502. The amplified optical signals from the respective two or more semiconductor optical amplifiers 502 are output to the optical WDM combiner stage 520. The optical WDM combiner stage 520 combines the respective amplified signals output from each of the respective semiconductor optical amplifiers 502 to form an optical output signal 506 that has substantially bandwidth as the selected bandwidth of the optical input signal 504.

Figure 6:
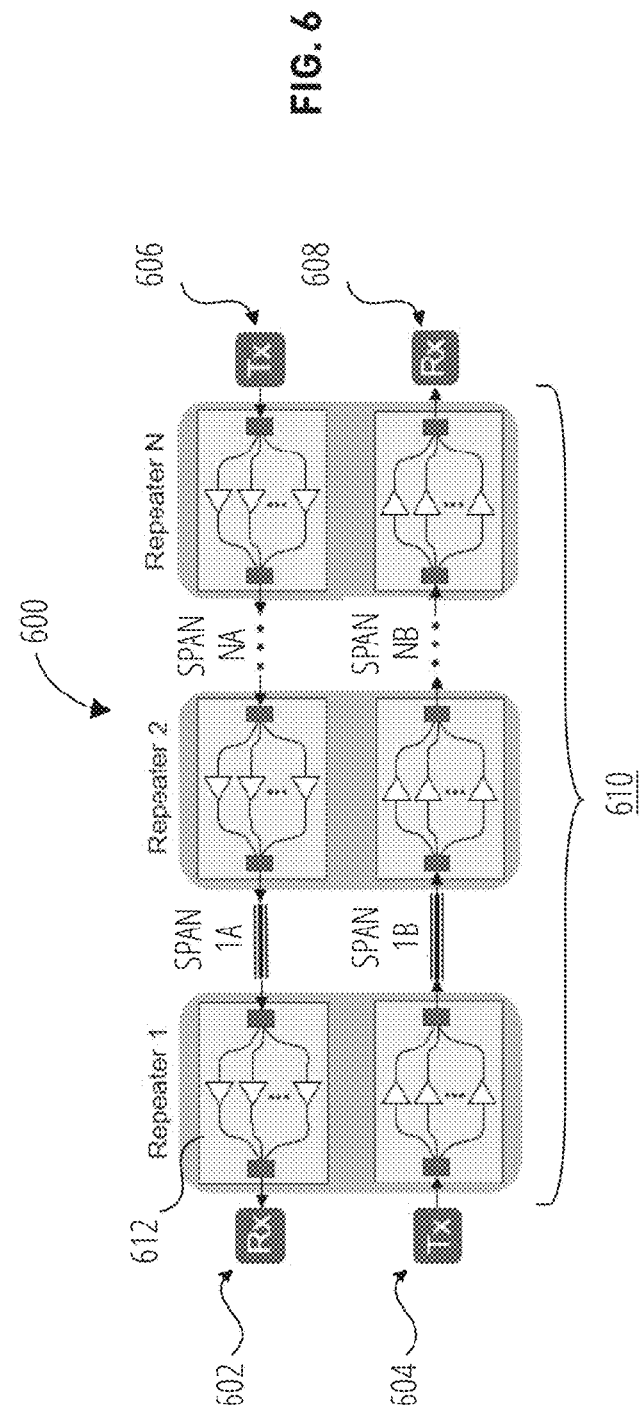
FIG. 6 illustrates an example system implementation utilizing semiconductor packages implementing the examples of FIGS. 2-5.

FIG. 6 illustrates an example system implementation utilizing semiconductor packages implementing the examples of FIGS. 2-5. The fiber optic transmission system 600 may include receiver 602 and transmitter 604 connected on one side of a fiber optic transmission line 610. The receiver 602 is operable to receive optical signals from the transmitter 606 located on the other side of the fiber optic transmission line 610. The transmitter 604 is operable to transmit optical signals to the receiver 608 also located on the other side of the fiber optic transmission line 610. The fiber optic transmission line 610 may have a number of spans, such as Span 1A to Span NA and Span 1B to Span NB. Between each respective span may be a repeater such as repeater 1, repeater 2 to repeater N, where N may be nearly any integer. The number of repeaters in the fiber optic transmission line 610 depends upon the length of the fiber optic transmission line 610. Each of the repeaters 1-N may include a semiconductor package 612 that is similar to semiconductor package 500 of FIG. 5. The repeaters 1-N may be tuned to the respective bandwidth of the optical signal or optical signals transmitted by the respective transmitters 604 and 606.

Herein, novel and unique techniques for an improved amplification of optical signals are disclosed. The present disclosure is not to be limited in scope by the specific examples described herein. Indeed, other various examples of and modifications to the present disclosure, in addition to those described herein, will be apparent to those of ordinary skill in the art from the foregoing description and accompanying drawings.

Thus, such other examples and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical amplifier, comprising:
   an optical signal divider having an input and a plurality of outputs, wherein the optical signal divider is operable to receive an optical signal having a first bandwidth and divide the optical signal into subbands for distribution among the plurality of outputs;
   a plurality of semiconductor optical amplifiers, wherein each semiconductor optical amplifier of the plurality of semiconductor optical amplifiers:
      has an input coupled to a respective optical signal divider output of the plurality of optical signal divider outputs,
      is tuned to amplify a respective subband within the first bandwidth of the optical signal, and
      has an output to output an amplified optical signal encompassing the respective subband; and
   an optical signal combiner coupled to the output of each of the plurality of semiconductor optical amplifiers, wherein the optical signal combiner is operable to combine each respective amplified optical signal encompassing the respective subband, and output an amplified optical signal having the first bandwidth,
   wherein the plurality of semiconductor optical amplifiers are tunable according to a set of parameters related to reducing a polarization dependent gain (PDG), wherein a given semiconductor optical amplifier of the plurality of semiconductor optical amplifiers is designed to provide amplification and to minimize the PDG within a limited optical bandwidth, comprising a bandwidth between 14 nanometers and 40 nanometers.

2. The optical amplifier of claim 1, wherein the optical signal divider divides the optical signal based on the first bandwidth and each of the plurality of outputs is provided a separate portion of the first bandwidth.

3. The optical amplifier of claim 2, wherein the optical signal divider further comprises:
   a plurality of thin film filters operable to divide the first bandwidth of the optical signal into the subbands for distribution.

4. The optical amplifier of claim 1, wherein the set of parameters includes one or more of:
- a maximum PDG ($PDG_{max}$);
- a maximum transmission performance penalty resulting from $PDG_{max}$ that is allowed by a transmission system design including the optical amplifier;
- a maximum operating bandwidth where $PDG_{max}$ can be satisfied; and
- a minimum gain in an operating bandwidth, where $PDG_{max}$ can be achieved.

5. The optical amplifier of claim 1, wherein a maximum PDG within the bandwidth is between 0.3-0.5 dB between two polarizations.

6. An optical signal amplifier stage, comprising:
- an input wavelength division demultiplexing section having an input operable to receive an optical signal having a plurality of bands, wherein the input wavelength division demultiplexing section includes a first wavelength division demultiplexer and a plurality of second wavelength division demultiplexers, the first wavelength division demultiplexer is tuned to a first bandwidth of optical spectrum that includes the plurality of bands of the received optical signal, and each respective second wavelength division demultiplexer of the plurality of second wavelength division demultiplexers is tuned to one or more of the plurality of bands of the optical spectrum;
- an amplifier section including a plurality of semiconductor optical amplifiers, wherein each respective semiconductor optical amplifier of the plurality of semiconductor optical amplifiers includes an input coupled to a respective second wavelength division demultiplexer of the input wavelength division demultiplexing section and is configured to amplify a respective portion of the first bandwidth output from a respective second wavelength division demultiplexer of the plurality of second wavelength division demultiplexers; and
- an output wavelength division multiplexing section coupled to an output of each of the plurality of semiconductor optical amplifiers in the amplifier section, the output wavelength division multiplexing section including a plurality of primary output wavelength division multiplexers and a secondary output wavelength division multiplexer coupled to a respective output of each of the plurality of primary output wavelength division multiplexers, wherein the output wavelength division multiplexing section is operable to output an amplified optical signal of the first bandwidth,
- wherein the plurality of semiconductor optical amplifiers are tunable according to a set of parameters related to reducing a polarization dependent gain (PDG).

7. The optical signal amplifier stage of claim 6, wherein each semiconductor optical amplifier of the plurality of semiconductor optical amplifiers is operable to minimize polarization diversity based on a selected bandwidth of the first bandwidth.

8. The optical signal amplifier stage of claim 6, wherein each semiconductor optical amplifier of the plurality of semiconductor optical amplifiers is tuned to a respective portion of the first bandwidth to provide maximum gain in the respective portion the semiconductor optical amplifier while maintaining the PDG below a predetermined threshold.

9. The optical signal amplifier stage of claim 6, wherein a given semiconductor optical amplifier of the plurality of semiconductor optical amplifiers is designed to provide amplification and to minimize the PDG within a limited optical bandwidth, comprising a bandwidth between 14 nanometers and 80 nanometers.

10. The optical signal amplifier stage of claim 9, wherein a maximum PDG within the bandwidth is between 0.3-0.5 dB between two polarizations.

11. The optical signal amplifier stage of claim 6, wherein the optical signal comprises a first bandwidth, and wherein each output of each of the plurality of semiconductor optical amplifiers is provided an equal portion of the first bandwidth.

12. The optical signal amplifier stage of claim 11, wherein the first bandwidth of the optical signal is filtered by a plurality of thin film filters operable to divide the first bandwidth.

13. An optical communication system, comprising:
- a first transceiver;
- a second transceiver, to receive and transmit a set of optical signals between the second transceiver and the first transceiver; and
- a set of optical amplifier stages, disposed between the first transceiver and the second transceiver, wherein a given optical amplifier stage of the set of optical amplifier stages comprises:
- an input wavelength division demultiplexing (WDM) section having an input operable to receive an optical signal having a plurality of bands, wherein the input WDM section includes a first wavelength division demultiplexer and a plurality of second wavelength division demultiplexers, the first wavelength division demultiplexer is tuned to a first bandwidth of optical spectrum that includes the plurality of bands of the received optical signal, and each respective second wavelength division demultiplexer of the plurality of second wavelength division demultiplexers is tuned to one or more of the plurality of bands of the optical spectrum;
- an amplifier section including a plurality of semiconductor optical amplifiers, wherein each respective semiconductor optical amplifier of the plurality of semiconductor optical amplifiers includes an input coupled to a respective second wavelength division demultiplexer of the input WDM section and is configured to amplify a respective portion of the first bandwidth output from a respective second wavelength division demultiplexer of the plurality of second wavelength division demultiplexers; and
- an output WDM section coupled to an output of each of the plurality of semiconductor optical amplifiers in the amplifier section, the output WDM section including a plurality of primary output wavelength division multiplexers and a secondary output wavelength division multiplexer coupled to a respective output of each of the plurality of primary output wavelength division multiplexers, wherein the output WDM section is operable to output an amplified optical signal of the first bandwidth,
- wherein the plurality of semiconductor optical amplifiers are tunable according to a set of parameters related to reducing a polarization dependent gain (PDG).

14. The optical communication system of claim 13, wherein each semiconductor optical amplifier of the plurality of semiconductor optical amplifiers is operable to minimize polarization diversity based on a selected bandwidth of the first bandwidth.

15. The optical communication system of claim 13, wherein each semiconductor optical amplifier of the plurality of semiconductor optical amplifiers is tuned to a respective portion of the first bandwidth to provide maximum gain in the respective portion the semiconductor optical amplifier while maintaining the PDG below a predetermined threshold.

16. The optical communication system of claim 13, wherein a given semiconductor optical amplifier of the plurality of semiconductor optical amplifiers is designed to provide amplification and to minimize the PDG within a limited optical bandwidth, comprising a bandwidth between 14 nanometers and 40 nanometers.

17. The optical communication system of claim 16, wherein the PDG is between 0.3-0.5 dB between two polarizations.

18. The optical communication system of claim 13, wherein the optical signal comprises a first bandwidth, and wherein each output of each of the plurality of semiconductor optical amplifiers is provided an equal portion of the first bandwidth.

* * * * *